United States Patent
Böger et al.

(10) Patent No.: US 9,873,237 B2
(45) Date of Patent: Jan. 23, 2018

(54) METHOD FOR FORMING A CRIMPING FOLD IN A MULTI-LAYER COMPOSITE MATERIAL AND MULTI-LAYER COMPOSITE MATERIAL HAVING AT LEAST ONE CRIMPING FOLD

(75) Inventors: Thorsten Böger, Duisburg (DE); Erik Hilfrich, Düsseldorf (DE); Oliver Kleinschmidt, Dortmund (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 814 days.

(21) Appl. No.: 12/990,888

(22) PCT Filed: Apr. 28, 2009

(86) PCT No.: PCT/EP2009/055158
§ 371 (c)(1),
(2), (4) Date: Dec. 29, 2010

(87) PCT Pub. No.: WO2009/135786
PCT Pub. Date: Nov. 11, 2009

(65) Prior Publication Data
US 2011/0123780 A1 May 26, 2011

(30) Foreign Application Priority Data
May 9, 2008 (DE) .......... 10 2008 023 017

(51) Int. Cl.
*B32B 15/08* (2006.01)
*B21D 19/00* (2006.01)
(Continued)

(52) U.S. Cl.
CPC .............. *B32B 15/08* (2013.01); *B21D 19/00* (2013.01); *B32B 1/00* (2013.01); *B32B 7/02* (2013.01);
(Continued)

(58) Field of Classification Search
CPC .......... B21D 19/00; B21D 5/04; B21D 5/045; B32B 15/08; B32B 3/04; B29C 53/04; B29L 2009/00
(Continued)

(56) References Cited

U.S. PATENT DOCUMENTS 3,647,590 A 3/1972 Wolf
3,922,899 A 12/1975 Fremont et al.
(Continued)

FOREIGN PATENT DOCUMENTS

DE 12 54 110 B 11/1967
DE 1527957 11/1971
(Continued)

OTHER PUBLICATIONS

Machine Translation of Description, Claims, and Abstract from DE 3831363.*
(Continued)

*Primary Examiner* — Brian Handville
(74) *Attorney, Agent, or Firm* — Reinhart Boerner Van Deuren P.C.

(57) ABSTRACT

A method for forming a beading fold in a multi-layer composite material, which has at least one core layer made of a plastics material and at least two cover layers made of a metallic material, provides high process reliability and optimal integrity of the formed multi-layer composite material. In particular, the method provides that, in the region of the beading fold to be formed, the core layer of the composite material is heated at least in portions to a temperature of 180° C. to 300° C. Also described herein is a multi-layer composite material having at least one beading fold, said material comprising at least one core layer made of a plastics material and at least two cover layers made of a metallic material.

10 Claims, 1 Drawing Sheet

(51) Int. Cl.
  *B32B 7/02* (2006.01)
  *B32B 15/04* (2006.01)
  *B32B 15/18* (2006.01)
  *B32B 1/00* (2006.01)
(52) U.S. Cl.
  CPC ............ *B32B 15/046* (2013.01); *B32B 15/18* (2013.01); *B32B 2266/00* (2013.01); *B32B 2266/0214* (2013.01); *B32B 2307/30* (2013.01); *B32B 2307/304* (2013.01); *B32B 2307/306* (2013.01); *B32B 2307/50* (2013.01); *B32B 2307/54* (2013.01); *B32B 2307/546* (2013.01); *B32B 2307/714* (2013.01); *B32B 2307/718* (2013.01); *B32B 2307/72* (2013.01); *B32B 2605/08* (2013.01); *Y10T 428/24628* (2015.01)
(58) Field of Classification Search
  USPC ............ 428/174; 72/342.1, 342.94; 264/345
  See application file for complete search history.

(56) References Cited

U.S. PATENT DOCUMENTS

| | | | |
|---|---|---|---|
| 5,354,522 A | 10/1994 | Baartman | |
| 5,987,957 A * | 11/1999 | Foeller et al. | ............... 72/379.2 |
| 6,136,415 A | 10/2000 | Spengler | |
| 6,592,968 B1 | 7/2003 | Schmit et al. | |
| 8,474,297 B1 * | 7/2013 | Bosco, Jr. | .................... 72/379.2 |
| 2005/0034306 A1 | 2/2005 | Patberg et al. | |

FOREIGN PATENT DOCUMENTS

| | | |
|---|---|---|
| DE | 2229265 | 12/1972 |
| DE | 2432929 | 1/1975 |
| DE | 3831363 | 9/1988 |
| DE | 199 19 783 A1 | 11/2000 |
| DE | 103 33 678 A1 | 2/2005 |
| DE | 69918878 | 8/2005 |
| GB | 1121627 | 7/1968 |
| GB | 2222791 A * | 3/1990 |
| JP | 50-10372 A | 2/1975 |
| JP | 2001158060 A | 6/2001 |
| KR | 10-2005-0027702 | 3/2005 |

OTHER PUBLICATIONS

International Search Report for International Application No. PCT/EP2009/055158.

English translation of DE 12 54 110.

* cited by examiner

METHOD FOR FORMING A CRIMPING FOLD IN A MULTI-LAYER COMPOSITE MATERIAL AND MULTI-LAYER COMPOSITE MATERIAL HAVING AT LEAST ONE CRIMPING FOLD

CROSS-REFERENCE TO RELATED APPLICATIONS

This application is a National Phase Application of International Patent Application No. PCT/EP2009/055158, filed on Apr. 28, 2009, which claims the benefit and priority to German Patent Application No. DE 10 2008 023 017.0-14 filed on May 9, 2008, which is owned by the assignee of the instant application. The disclosure of each of these applications is incorporated herein by reference in its entirety.

FIELD OF THE INVENTION

The invention relates to a method for forming a beading fold in a multi-layer composite material, which has at least one core layer made of a plastics material and at least two cover layers made of a metallic material. Furthermore, the invention relates to a multi-layer composite material having at least one beading fold with at least one core layer made of a plastics material and at least two cover layers made of a metallic material.

BACKGROUND

Multi-layer composite materials are known from the prior art. The Korean publication with the number 10 2005 0027702 A, for example, discloses a roof element of a vehicle body, in which a three-layer composite material provided with a turn-up is arranged. The composite material, in this case, has a core layer made of a synthetic resin, in particular polypropylene. Generally, an advantageous balance between the weight and the rigidity or, respectively, the strength of the composite material is provided by means of the core layer made of a plastics material and the two cover layers made of a metallic material. The stress on the core layer is less in the case of typical loads than that on the cover layer, so that a plastics material which is substantially distinguished by its low density compared to metal materials, and therefore its lower weight, can be selected for the core layer. Moreover, composite materials of this type have heat-insulating and vibration-damping properties.

The German published application 1 527 957 in turn discloses a three-layer composite material with two outer sheet metal layers and a core layer made of a plastics material, for example polyvinyl acetate provided with additives, which is deep-drawn. In order to reduce the viscosity of the plastics material core layer, the deep-drawing process should take place at a temperature of 120° C. to 160° C. It should be possible to increase the limit drawing ratio, in particular, by this measure. The forming radii produced during the deep-drawing are, however, significantly larger relative to the radii of turn-ups or beading folds, respectively, which is why the stress on the material of the individual layers is significantly less in the region of the forming bend during deep-drawing than during the incorporation of a beading fold or turn-up. As the plastics material core layer, in contrast to DE 1 527 957, also generally has a significantly greater thickness than the cover layers, the cover layers are disproportionately susceptible with respect to loading exerted during forming, and therefore a material failure, for example ruptures, cracks or the like can occur on the cover layers.

SUMMARY OF THE INVENTION

The present invention is therefore based on an aspect of providing a method for forming a beading fold in a multi-layer composite material, which ensures high process reliability and an optimal integrity of the formed multi-layer composite material. Furthermore, the present invention is based on an aspect of providing a correspondingly formed multi-layer composite material.

The aspect is achieved according to a first teaching of the present invention by a method for forming a beading fold in a multi-layer composite material, which has at least one core layer made of a plastics material and at least two cover layers made of a metallic material, the core layer of the composite material being heated, at least in portions, to a temperature of 180° C. to 300° C. in the region of the beading fold to be formed.

According to the invention, it was recognised that owing to the action of heat, in particular at a temperature of 180° C. to 300° C., the strength of the plastics material core layer may be reduced. A beading fold is characterised in that the material is formed with a very small radius in the region of the bend. Thereby, the outer cover layer covers a larger extent than the inner cover layer. As a result, the outer cover layer has to be extended, which leads to high tensile stresses, which can lead to the failure of the material of the outer cover layer. This effect is all the more critical, the thicker the core layer and the thinner the cover layers.

Due to the heating of the composite material the strength of the core layer is reduced to such an extent that it can be partially displaced during the beading by the pressure forces exerted by the beading tool. This changes the geometry of the beading fold to the effect that the outer cover layer has to cover a smaller extent in comparison to the situation with a non-heated core layer. As a result, the tensions in the cover layers and therefore the risk of failure of the outer and the inner cover layer are reduced. The waste of multi-layer composite material, the cover layers of which have cracks, ruptures or the like in the region of the beading fold bend, can therefore be reduced, which, in particular, provides an economic advantage.

It is unimportant in the scope of the invention how the core layer is heated during the forming process to the temperature between 180° C. and 300° C. The heat is preferably introduced by heat conduction, induction or radiation into the cover layers and guided on from there by heat conduction into the core layer. The heating of the cover layer is, in this case, not advantageous and not necessarily desired for the beading. However, as it cannot be completely avoided, a temperature range is preferred, in which the material properties of the metallic cover layers are only insignificantly changed and, at the same time, the material properties of the core layer are greatly changed. Advantageously, the temperature state of the core layer is measured before and after the forming and during the forming. In this manner, a reliable conduct of the process can be ensured.

The two cover layers may be manufactured from the same metallic material or from different metallic materials. The use of the same metallic material leads to a composite material with a symmetrical structure, which, in particular, can facilitate the further processing of the composite material. By using different metallic materials, the composite material can, in turn, be very flexibly adapted to different requirements of the two cover layers in different further processing steps or use steps, respectively.

In an advantageous embodiment of the method, the heating is carried out to a temperature of 200° C. to 260° C. A balance can thus be attained between the reduced strength of the plastics material brought about by the heat and the stability of the plastics material. A high temperature in the region of 300° C. ensures a maximum strength reduction without irreversibly, if so irreparably affecting the structure of the plastics material itself. The pronounced reduction in the strength means that the displacement of the plastics material during the forming is promoted. A moderate increase in the temperature of 180° C. defined in the scope of the present invention, on the other hand, ensures that—with a still adequately good forming capability of the composite material into beading folds with small radii—the structure of the plastics material and therefore the stability of the plastics material during the forming is maintained to a high degree. By a selection of a temperature between 200° C. and 260° C. the method can fulfil both requirements.

The heating process is preferably ended before the beginning of the forming process. In this manner, the phase of heating and the phase of forming the beading fold in the heated region of the composite material can be separated. A reliable process sequence can therefore be ensured particularly advantageously. The devices used to heat the composite material can, for example, be removed from the composite material, so that sufficient space is available for the forming tools or beading tools, respectively. As the forming process basically does not take very long, excessive cooling of the heated composite material is not to be expected.

However, it is also alternatively possible to carry out the heating process at least temporarily during the forming process.

The method for forming a beading fold can thus be carried out very efficiently in terms of time, as the heating phase, in other words the time to be used for heating at least the plastics material, and the forming process at least temporarily run in parallel. Thus, for example, the devices for heating and the devices for beading can also be combined in a multi-functional device. The beading tool can therefore also be equipped with a heating element, which transmits its thermal energy, at least temporarily during the forming, to the composite material. This variant is to illustrate the flexibility of the method according to the invention.

The metallic material of the cover layers is preferably a steel or a, in particular higher strength or very high strength, steel alloy. As a result, the properties of the different materials of the core layer and the cover layers can advantageously supplement one another, in particular if a composite material is necessary which is to have a specific minimum thickness but the weight of which is not to exceed a specific maximum limit. By using a steel or a, in particular higher strength or very high strength, steel alloy, these requirements are advantageously fulfilled as the cover layers made from a steel or a steel alloy provide a high strength or, respectively, rigidity whereas the core layer made of a plastics material can be used to adjust a specific thickness of the composite material, and nevertheless, because of the low density of the plastics material, only makes a comparatively small contribution to the total weight of the composite material. Moreover, steels or steel alloys provide a good corrosion resistance, a good forming behaviour and are particularly suitable for welding.

In a further advantageous embodiment of the method, the cover layers may have thicknesses which are identical or different from one another. The composite material can thus be adapted to the different loads acting on the two cover layers. A configuration with identical thicknesses particularly facilitates the further processing of the composite material, as the composite material has no preferred direction, but is substantially symmetrical.

The core layer preferably has a thickness which is greater by the factor of 2 to 5 than the thickest cover layer. A particularly suitable ratio is thus achieved between the weight of the composite material and the strength or, respectively, rigidity of the composite material. Advantageous heat-insulating and vibration-damping properties can also thus be achieved. The core layer made of a plastics material may, for example, have a thickness of 0.75 mm, whereas the cover layers made of a metallic material are about 0.25 mm thick. This would correspond to a ratio of about 3 to 1. The total thickness of the composite material outside a beading fold which is produced during the forming process would therefore be about 1.25 mm. This thickness gives the composite material properties, such as are preferred in automotive engineering, in particular body construction, to manufacture carrier elements or profile elements.

According to a further preferred embodiment of the method, the core layer consists of a foamed plastics material. The plastics material (the polymer) is advantageously provided with gas inclusions, preferably with air, carbon dioxide ($CO_2$), nitrogen or another inert gas or noble gas. The advantage is that, in the heated state, the plastics material cannot only be partially displaced to the side, but is also intrinsically compressible. As a result, the fold region can be still better deformed and the stresses in the cover layers further reduced.

According to a further teaching of the present invention, the aspect is also achieved by a multi-layer composite material having at least one beading fold, with at least one core layer made of plastics material and at least two cover layers made of a metallic material, in which the core layer tapers in the region of the bend of the beading fold relative to the regions outside the bend of the beading fold.

This leads to the fact that the outer cover layer has to cover a smaller extent. As a result, the stresses in the cover layers, and therefore the risk of failure of the outer and the inner cover layer, are reduced.

The metallic material of the cover layers is preferably a steel or a, in particular higher strength or very high strength, steel alloy. Consequently, the properties of the different materials of the core layer and the cover layers can advantageously supplement one another, in particular when a composite material is necessary, which is to have a specific minimum thickness but the weight thereof is not to exceed a specific maximum limit. By using a steel or a, in particular higher strength or very high strength, steel alloy, these requirements are advantageously fulfilled as the cover layers made of a steel or a steel alloy provide a high strength or, respectively, rigidity, whereas the core layer made of a plastics material can be used to adjust a specific thickness of the composite material, and nevertheless, because of the small density of the plastics material, only makes a comparatively small contribution to the total weight of the composite material. Moreover, steels or steel alloys provide good corrosion-resistance, good forming behaviour and are particularly suitable for welding.

In a further advantageous configuration of the multi-layer composite material, the cover layers may have thicknesses which are identical or differ from one another. The composite material can thus be adapted to the different loads acting on the two cover layers. A configuration with identical thicknesses particularly facilitates the further processing of the composite material as the composite material has no preferred direction, but is substantially symmetrical.

The core layer preferably has a thickness which is greater by the factor of 2 to 5 than the thickest cover layer. A particularly suitable ratio is thus achieved between the weight of the composite material and the strength or, respectively, rigidity of the composite material. Advantageous heat-insulating and vibration-damping properties can also thus be achieved. The core layer made of a plastics material may, for example, have a thickness of 0.75 mm, whereas the cover layers made of a metallic material are about 0.25 mm thick. This would correspond to a ratio of about 3 to 1. The total thickness of the composite material outside a beading fold which is produced during the forming process would therefore be about 1.25 mm. This thickness gives the composite material properties such as are preferred in automotive engineering, in particular body construction, to manufacture carrier elements or profile elements.

The use of the multi-layer composite material having at least one beading fold is particularly preferred in automobile production, in particular body production, for the manufacture of a carrier element or profile element as the advantageous weight-saving properties and the strength or, respectively, rigidity properties brought about by the cover layers can be advantageously combined and used there.

BRIEF DESCRIPTION OF THE DRAWINGS

There are numerous possible embodiments of the method according to the invention and the multi-layer composite material according to the invention. The invention will be described in more detail below with the aid of exemplary embodiments shown in the drawings, in which.

DESCRIPTION

Figure 1:
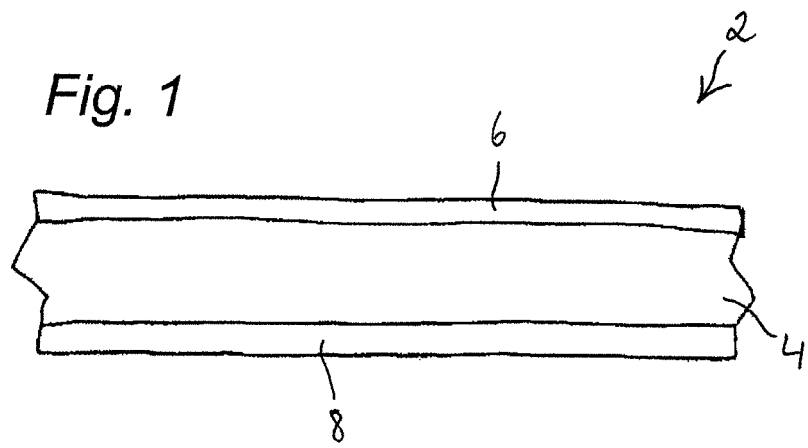
FIG. 1 shows a cross-sectional view of a three-layer composite material.

FIG. 1 shows a cross-sectional view of a detail of an exemplary three-layer composite material 2 which can be used to form a beading fold therein. The core layer 4 consists of a plastics material and, for example, has a thickness of 0.75 mm. Arranged on both sides of the core layer 4 is a respective cover layer 6, 8 made of a steel. Also, in particular higher strength or very high strength, steel-alloys can be used as the material of the cover layers 6, 8. The cover layers 6, 8, in this example, have identical thicknesses of about 0.25 mm, but may also be configured with thicknesses which differ from one another. The core layer 4 in general preferably has a thickness which is greater by the factor of 2 to 5 than the thickness of the thickest cover layer 6, 8. It is also possible to provide more than one core layer 4 between the two cover layers 6, 8 if this is expedient for the application. Further core layers 4 would then advantageously also have to be formed from a material with a comparatively low density, such as, for example, a plastics material.

Figure 2:
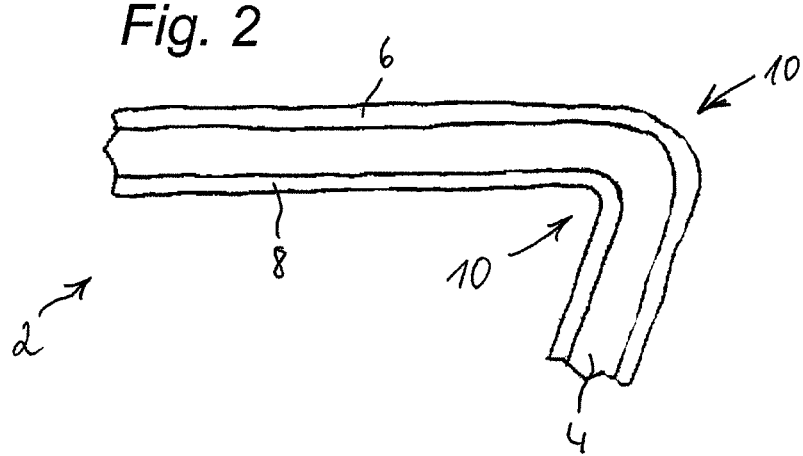
FIG. 2 shows a cross-sectional view of a three-layer composite material having a beading fold, as known from the prior art.

FIG. 2 now shows the three-layer composite material 2 known from FIG. 1 when it has been provided in a traditional manner with a beading fold. The radius of the bend 10 of the beading fold, which is small in comparison to a forming brought about by means of deep-drawing, can be seen in FIG. 2. Owing to the use of a traditional method, not taking into account the material structure, of forming a beading fold, the thickness of the plastics material core layer 4 in the region of the bend 10 of the beading fold is substantially equal to the thickness, such as is present outside the bend 10 of the beading fold and therefore also such as was present before the beading fold was formed into the three-layer composite material 2. However, this can lead, because of the comparatively high stress, to the failure of the material of the cover layers 6, 8 made of steel in the region of the bend 10 of the beading fold, so that the risk of cracks or ruptures in the cover layers 6, 8 is increased at this point.

Figure 3:
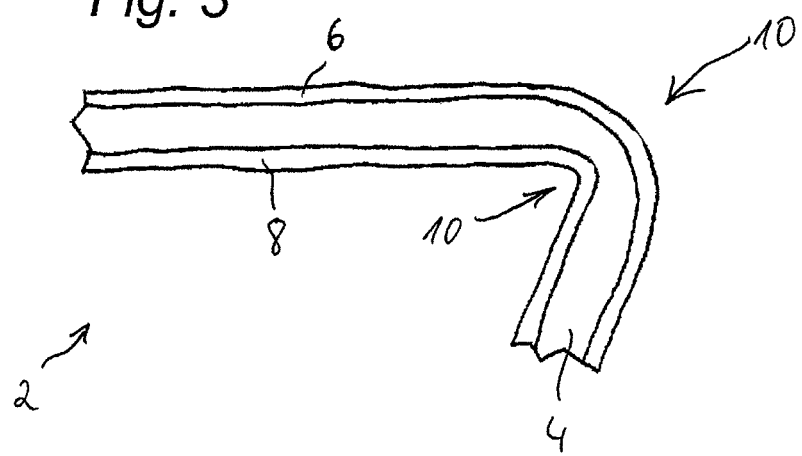
FIG. 3 shows a cross-sectional view of a three-layer composite material having a beading fold according to the present invention.

In contrast to this, FIG. 3 shows the three-layer composite material 2, as is known from FIG. 1, when a beading fold has been formed by the method according to the present invention into the composite material 2. The strength of the plastics material is reduced by the heating of at least the material of the core layer 4 to a temperature of between 180° C. and 300° C., in particular 200° C. and 260° C. Owing to the beading process carried out at this temperature, the material of the core layer 4 may be partially displaced from the region of the bend 10 of the beading fold to be formed. As a result, the outer cover layer 6 covers a smaller extent than in comparison to the example in FIG. 2, so that the stresses and the risk of failure of the cover layers 6, 8, in particular in the region of the bend 10 of the beading fold to be formed, can be reduced. Accordingly, the core layer 4 in the region of the bend 10 of the formed beading fold tapers compared to the regions outside the bend 10 of the beading fold. In particular the process reliability of the method and the integrity of the multi-layer composite material 2 can thus be increased.

The invention claimed is:

1. Method for forming a beading fold in a multi-layer composite material, which has at least one core layer made of a plastics material and at least two cover layers made of a metallic material, wherein the complete material of the at least one core layer of the composite material is heated to a temperature of 180.degree. C. to 300.degree. C. in a region of the beading fold to be formed to reduce the strength of the plastics material so that the plastics material from the region of the beading fold is partially displaced and the core layer in the region of the bend of the formed beading fold tapers compared to regions outside of the bend of the beading fold.

2. Method according to claim 1, wherein the heating is carried out to a temperature of 200.degree. C. to 260.degree. C.

3. Method according to claim 1, wherein the heating is ended before the beginning of the forming.

4. Method according to claim 1, wherein the heating is carried out at least temporarily during the forming.

5. Method according to claim 2, wherein the metallic material of the at least two cover layers is a steel or a steel alloy.

6. Method according to claim 1, wherein the at least two cover layers have thicknesses which are identical or differ from one another.

7. Method according to claim 1, wherein the at least one core layer has a thickness which is greater by a factor of 2 to 5 than the thickest cover layer.

8. Method according to claim 1, wherein the at least one core layer consists of a foamed plastics material.

9. An automobile part formed as one element selected from the group consisting of a carrier element and profile element comprising a multi-layer composite material having at least one beading fold formed by the method of claim 1.

10. Method according to claim 8, wherein the foamed plastics material includes gas inclusions.

\* \* \* \* \*

UNITED STATES PATENT AND TRADEMARK OFFICE
CERTIFICATE OF CORRECTION

PATENT NO. : 9,873,237 B2
APPLICATION NO. : 12/990888
DATED : January 23, 2018
INVENTOR(S) : Thorsten Böger et al.

It is certified that error appears in the above-identified patent and that said Letters Patent is hereby corrected as shown below:

On the Title Page

Item (87) PCT Pub. Date: delete "November 11, 2009" and replace with --November 12, 2009--

Signed and Sealed this
First Day of May, 2018

Andrei Iancu
*Director of the United States Patent and Trademark Office*